Aug. 11, 1970  J. T. SALIHI  3,524,079
PULSE MODULATOR

Original Filed May 20, 1965  3 Sheets-Sheet 1

INVENTOR.
Jalal T. Salihi
BY C. R. Meland
HIS ATTORNEY

Aug. 11, 1970   J. T. SALIHI   3,524,079
PULSE MODULATOR

Original Filed May 20, 1965   3 Sheets-Sheet 3

INVENTOR.
Jalal T. Salihi
BY C. R. Meland
HIS ATTORNEY

United States Patent Office 3,524,079
Patented Aug. 11, 1970

3,524,079
PULSE MODULATOR
Jalal T. Salihi, Birmingham, Mich., assignor to General Motors Corporation, Detroit, Mich., a corporation of Delaware
Original application May 20, 1965, Ser. No. 457,374. Divided and this application Nov. 20, 1967, Ser. No. 684,116
Int. Cl. H03k 17/00
U.S. Cl. 307—252                                    8 Claims

ABSTRACT OF THE DISCLOSURE

This invention relates to a pulse modulator for controlling the average direct current voltage applied to a load from a source of direct current having a substantially fixed terminal voltage. The modulator includes a first controlled rectifier connected in series in one line that connects the source of direct current and the load. The first controlled rectifier is periodically turned off by a pulse forming network comprised of a plurality of capacitors and controlled rectifiers that shunt the first controlled rectifier. The pulse forming network can feed energy to the load even when the first controlled rectifier is maintained off and includes a double branch circuit of controlled rectifiers and capacitors.

---

This application is a division of copending application Ser. No. 457,374 filed on May 20, 1965.

This invention relates to a modulator which can be used to control the amount of power supplied to a three phase induction motor through an inverter.

One of the objects of this invention is to provide a modulator which has a direct current input and which is controlled by a trigger circuit to give a smooth variable direct current output by means of either pulse width control or pulse frequency control or a combination of both.

Another object of this invention is to provide a modulator that is capable of operating through a wide range of power levels.

A further object of this invention is to provide a controlled rectifier modulator that employs a double branch commutating circuit. Using the double branch commutating circuit makes the circuit operate reliably at all power levels. It also makes the spacing of trigger pulses uncritical such that almost full conduction angle may be obtained reliably. By using this double branch commutating circuit, it is also possible to reduce the power requirement of the controlled rectifiers that are used in the modulator.

A further object of this invention is to provide a modulator which is capable of providing pulse width control from a relatively simple trigger circuit.

Still another object of this invention is to provide a motor control system wherein the power supplied to the motor is controlled by a modulator that can be controlled either by pulse width control or pulse frequency control.

Another object of this invention is to provide a modulator that includes elements controlled by a pulse frequency control signal and wherein these elements are used to shut-off a controlled rectifier which is used for pulse width control.

Still another object of this invention is to provide a modulator wherein a controlled rectifier is connected between a source of direct current and a load and wherein this controlled rectifier is pulsed to provide a variable output and further wherein a double branch commutating circuit is provided for shutting off the controlled rectifier and for providing pulse frequency control.

Another object of this invention is to provide a power control system for an electric powered vehicle which includes a modulator that is capable of being controlled by pulse frequency control and pulse width control and wherein a control device such as an accelerator pedal determines whether or not the modulator is operating in the pulse frequency control mode or in the pulse width control mode. In carrying this object forward, the vehicle is preferably operated by pulse freqeuncy control during initial acceleration but is shifted to pulse width control when the motor comes up to speed.

Further objects and advantages of the present invention will be apparent from the following description, reference being had to the accompanying drawings wherein preferred embodiments of the present invention are clearly shown.

Figure 1:
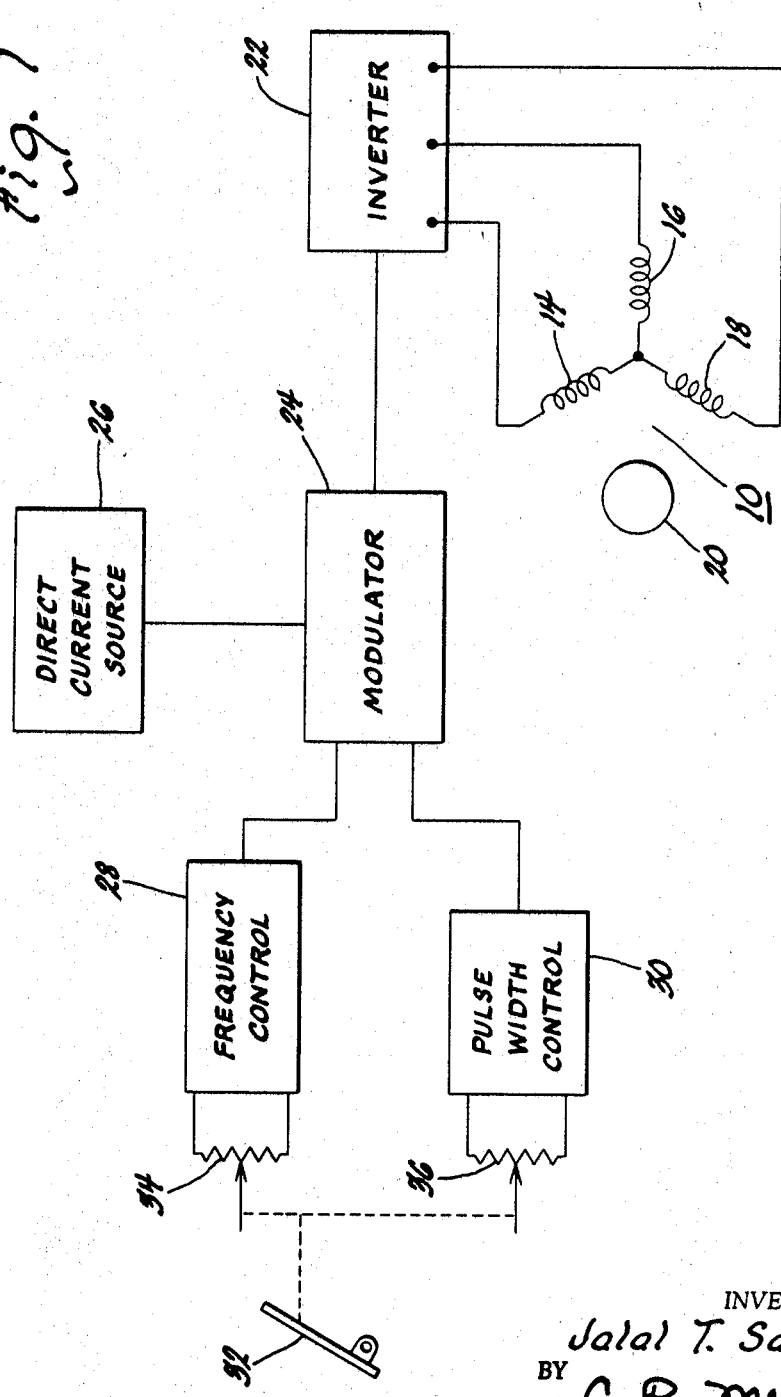
FIG. 1 is a block diagram illustration of a motor control system that uses the modulator of this invention.

Referring now to the drawings and more particularly to FIG. 1, the reference numeral 10 generally designates a three phase Y-connected induction motor having phase windings 14, 16, 18 and a rotor 20. The induction motor 10 is fed from a three phase inverter designated by reference numeral 22 which can be of various circuit configurations but preferably is of the type illustrated in patent application Ser. No. 457,367, filed on May 20, 1965 and assigned to the assignee of this invention.

Figure 2:
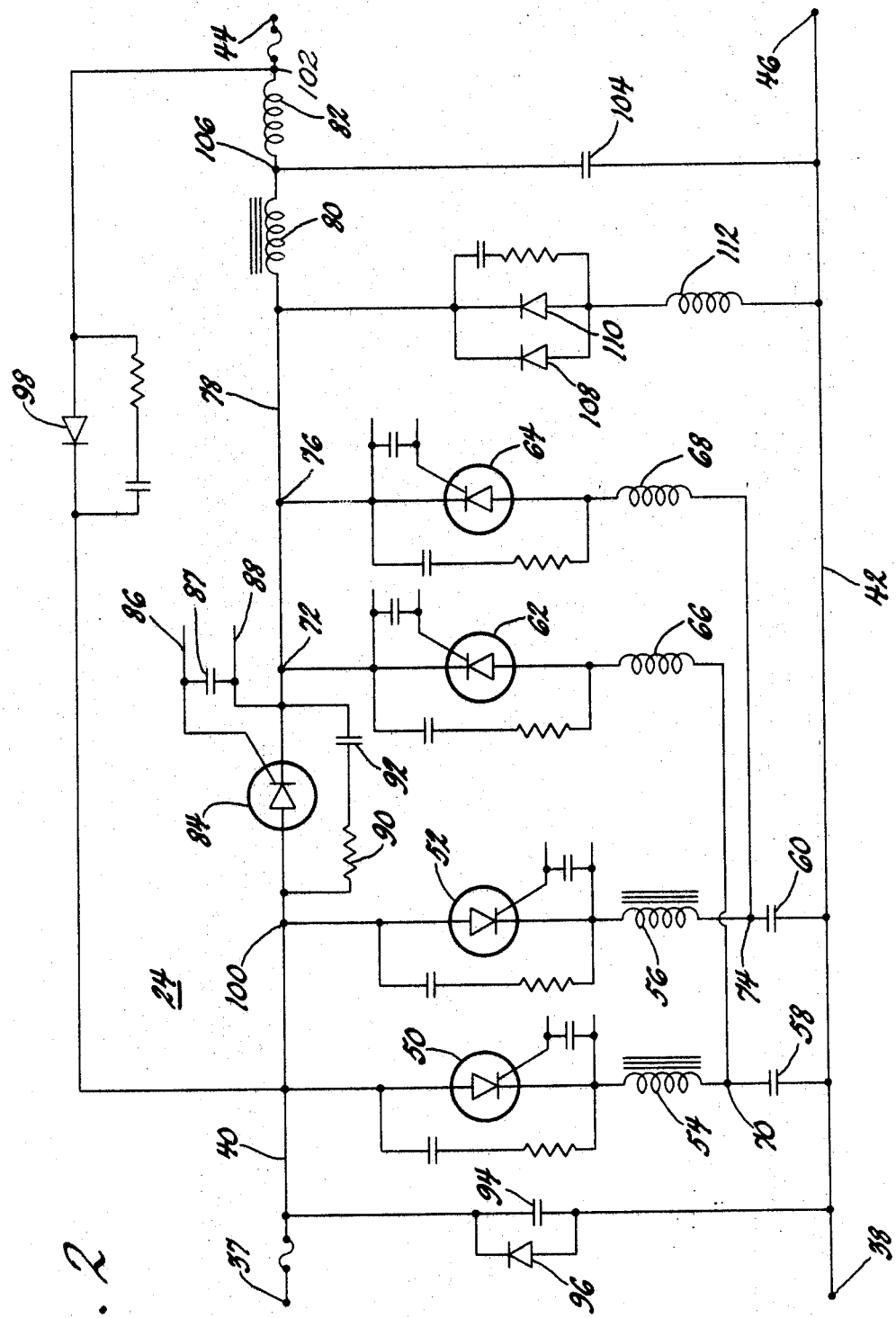
FIG. 2 is a schematic circuit diagram of a modulator made in accordance with this invention.

The inverter 22 is fed by the modulator 24 of this invention which is illustrated in FIG. 2. The modulator is connected with a source of direct current 26 and receives trigger information from a frequency control device 28 and a pulse width control device 30. Where the electric motor 10 is used as the source of motive power for a vehicle, the frequency control 28 and the pulse width control 30 are controlled by an accelerator pedal 32. The accelerator pedal 32 controls variable resistors 34 and 36 which in turn supply input information respectively to the frequency control 28 and the pulse width control 30.

It is preferred in applications where the motor 10 drives a vehicle such as a passenger car that the frequency control be used during initial acceleration of the motor and that the pulse width control be used following initial acceleration of the motor. This can be accomplished by providing a mechanical linkage or other means connected between the accelerator pedal 32 and the controls 34 and 36 such that the control 36 does not become effective until the control 34 is moved to one extreme position.

The frequency control 28 and the pulse width control 30 actually comprise a number of circuits which for purposes of simplification are not illustrated in FIG. 1. The exact control, however, is disclosed in patent application Ser. No. 457,373, filed on May 20, 1965 now Pat. 3,419,818 and assigned to the assignee of this invention.

Referring now more particularly to FIG. 2, the modulator 24 is illustrated. This modulator includes power input terminals 37 and 38 connected respectively with power input conductors 40 and 42. The input terminals 37 and 38 are connected across a source of direct current such as source 26. The modulator of FIG. 2 has output terminals 44 and 46 which are connected with the inverter 22.

The modulator of FIG. 2 includes controlled rectifiers 50 and 52 which are connected in series with the inductors 54 and 56. The inductors 54 and 56 are connected respectively with capacitors 58 and 60. The modulator includes controlled rectifiers 62 and 64. The anode of controlled rectifier 62 is connected with an inductance 66 whereas the anode of controlled rectfier 64 is connected with inductance 68. The series connected inductance 66 and controlled rectifier 62 are connected between junctions 70 and 72. The series connected inductance 68 and controlled rectifier 64 are connected between junctions 74 and 76. The junctions 72 and 76 are connected with a power output conductor 78. The power output conductor is connected with output terminal 44 through the inductors 80 and 82.

The modulator of FIG. 2 has another controlled rectifier 84 having its anode connected with power input conductor 40 and its cathode connected with power output conductor 78. It is seen that the gate and cathode electrodes of controlled rectifier 84 are connected with conductors 86 and 88 and these conductors are connected by a capacitor 87. The conductors 86 and 88 form pulse input terminals for controlled rectifier 84 and it is seen that the other controlled rectifiers 50, 52, 62 and 64 have similar input terminals for applying triggering pulses respectively to the controlled rectifiers. The anode-cathode circuit of controlled rectifier 84 is shunted by a series connected resistor and capacitor 90 and 92. The other controlled rectifiers of the system have a series connected resistor and capacitor connected across the anode-cathode circuit as shown.

A capacitor 94 is connected across power supply conductors 40 and 42 and this capacitor is shunted by a diode 96.

A diode 98 connects the junctions 100 and 102. A capacitor 104 connects junction 106 with conductor 42. The conductors 78 and 42 are connected by diodes 108 and 110 through an inductor 112.

Figure 3:
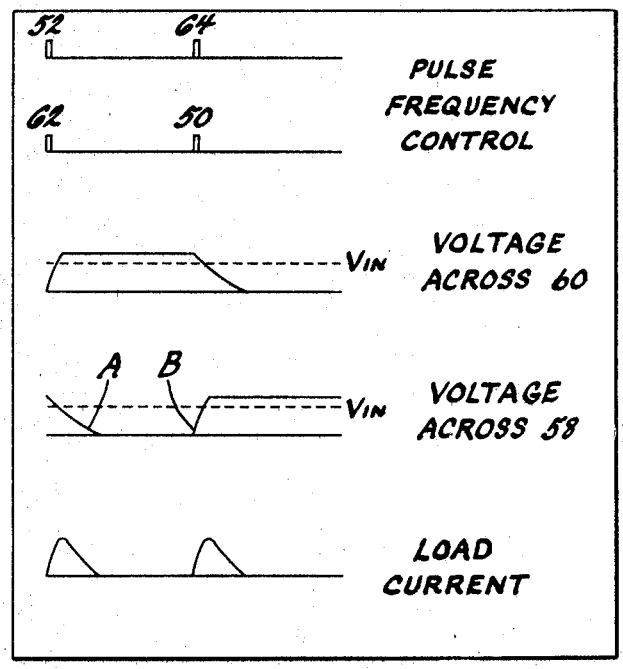
FIG. 3 illustrates a series of pulse wave forms for various components of the systems illustrated in FIGS. 1 and 2.

The operation of the modulator illustrated in FIG. 2 will now be described. The modulator shown in FIGS. 1 and 2 is triggered by the voltage pulses coming from the frequency control 28 and at times by the pulses coming from the pulse width control 30. FIG. 3 illustrates the voltage pulses applied to the modulator 24 from the frequency control 28 and these pulses have been identified by the same reference numerals that are used in FIG. 2 to identify the corresponding controlled rectifier that is triggered by these pulses. Thus the voltage pulse 52 shown in FIG. 3 is applied across the gate and cathode electrodes of controlled rectifier 52 to turn it on. The same is true of voltage pulses 64, 62 and 50 which respectively trigger controlled rectifiers 64, 62 and 50 in the sequence illustrated in FIG. 3. FIG. 3 also illustrates the voltage developed across the capacitors 60 and 58 and also illustrates the load current during frequency control.

Assuming now that a control pulse 52 has been applied to the controlled rectifier 52, it will be turned on in its anode-cathode circuit and the capacitor 60 will be charged from the source of direct current through the inductance 56. The capacitor 50 will charge to a voltage higher than the voltage applied to conductors 40 and 42 as determined by the Q of the circuit. As a result of this charging of capacitor 60 through the inductance 56, the voltage of the cathode of controlled rectifier 52 will be raised sufficiently to turn off this controlled rectifier. The Q of the resonant circuit is determined by the values of lead inductance 56 and the capacitor 60.

The capacitor 60 will remain charged until the control pulse 64 is applied to controlled rectifier 64 to turn it on. When this happens, the capacitor 60 will discharge through inductance 68, controlled rectifier 64 and through the load that is connected with output terminals 44 and 46.

In a similar fashion, capacitor 58 will be charged through inductance 54 when controlled rectifier 50 is triggered to a conductive condition. The capacitor 58 can discharge through the controlled rectifier 62, inductance 66 and through the load when controlled rectifier 62 is triggered to a conductive condition.

The controlled rectifiers 62 and 64 are sequentially turned off by the sequential discharge of capacitors 58 and 60. Thus, for example, when capacitor 58 has discharged through controlled rectifier 62, this controlled rectifier is turned off by the beginning of the discharge of capacitor 60 through controlled rectifier 64. This is important in this system because it is possible under reduced load conditions for the trailing edge A (FIG. 3) of the discharge voltage across one of the capacitors to overlap the beginning B of the charging part of the cycle for the capacitor. If it were not for the double branch commutating circuit including controlled rectifiers 62 and 64, it might be possible to have the controlled rectifiers 50 and 62 turned on at the same time to provide a direct circuit between junctions 100 and 72. However, with the double branch circuit, the discharge of capacitor 60 through controlled rectifier 64 immediately turns off controlled rectifier 62 so that there is no possibility of making a direct connection between the input and output terminals of the modulator through two controlled rectifiers under light load conditions. This also applies to the two controlled rectifiers 52 and 64.

It will be appreciated that during frequency control, the output voltage supplied to the load is provided by the discharge of capacitors 58 and 60. It will also be appreciated that the amount of power supplied to the load can be controlled by varying the frequency of the pulses shown in FIG. 3 that trigger the controlled rectifiers. This is true since the energy stored in the capacitor per cycle is fixed and therefore the power supplied to the load depends upon the number of discharges per second.

Figure 4:
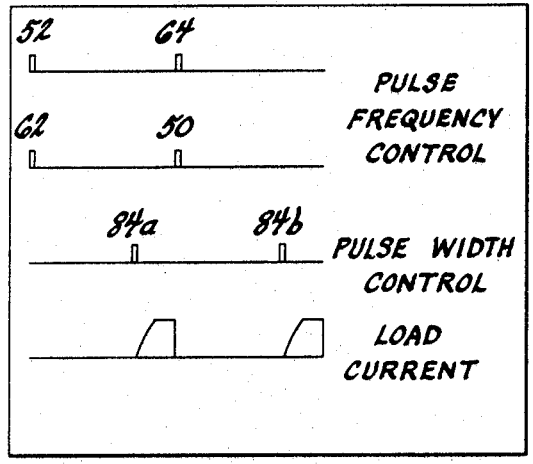
FIG. 4 illustrates voltage wave forms of the modulator of this invention during pulse width control.
Figure 5:
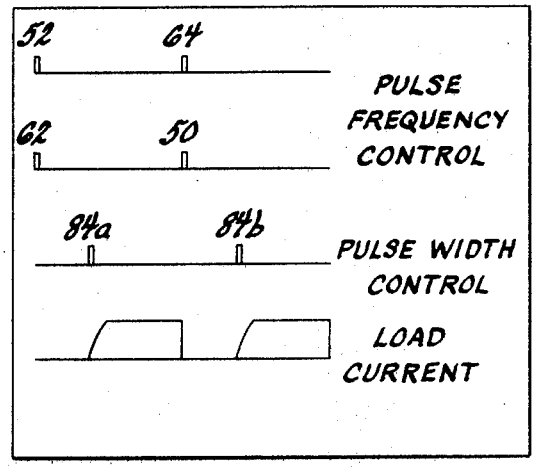
FIG. 5 illustrates the same voltage wave forms as FIG. 4 but shifted in time to illustrate the pulse width control of the modulator of this invention.

When it is desired to increase the power supplied to the load, the pulse width control 30 is brought into operation to supply the triggering pulses 84a, and 84b illustrated in FIGS. 4 and 5 across the input conductors 86 and 88 of controlled rectifier 84. During pulse width control, the output from capacitors 58 and 60 is fixed at a frequency of, for example, 500 cycles per second. As the accelerator pedal is depressed, the output of the frequency control 28 increases up to 500 cycles per second whereupon the pulse width control 30 comes into operation to apply trigger pulses 84a and 84b to the controlled rectifier 84. As pointed out above, the controls 28 and 30 are fully disclosed in above-mentioned patent application Ser. No. 457,373.

During pulse width control, the relationship of the voltage pulses applied to the controlled rectifiers of the modulator shown in FIG. 2 are illustrated in FIGS. 4 and 5. As mentioned above, the pulses applied to controlled rectifiers 50, 52, 62 and 64 will be at a constant frequency of approximately 500 cycles per second. When a pulse such as pulse 84a is applied to controlled rectifier 84, the pulse 84a will turn on the controlled rectifier 84 in its anode-cathode circuit and power can now be applied directly to the load from conductor 40, through the anode-cathode circuit of controlled rectifier 84, and through power supply conductor 78. The controlled rectifier 84 will remain conductive until pulse 64 takes place to trigger the controlled rectifier 64 and discharge the capacitor 60. The controlled rectifier 84 is turned off by the discharging of capacitor 60 through controlled rectifier 64. The amount of power supplied to the load will now be determined by the time-spaced relationship of pulses 84a and 64 as is depicted in FIG. 4. It is seen from FIG. 5 that when the pulses 84a and 84b occur earlier in the cycle, the space between pulses 84a and 64 is increased to increase the load current supplied to the load. This provides pulse width control by varying the time that the pulses 84a and 84b occur in relationship to the control pulses 62 and 64.

In the mode of operation just described, the frequency of pulses 52, 64, 62 and 50 and the frequency of pulses 84a and 84b have been held at a fixed value. This can be accomplished by the trigger circuit disclosed in copending patent application Ser. No. 457,373 which is now Pat. 3,419,818. It will be appreciated, however, that the modulator of FIG. 2 can be controlled to provide frequency control, pulse width control or a combination of both by trigger circuits other than the one illustrated in application Ser. No. 457,373, now Pat. 3,419,818.

The function of the diode 98 is to limit the maximum output voltage of the modulator and provides a path for discharging the inductances 80, 82 and 112 during faulty operation as, for example, the failure of a fuse or a heavy transient.

The diode 96 provides a path for the discharge of inductances 54 and 56 during a faulty operation such as the failure of a fuse or heavy transient. The capacitor 92 and the resistor 90 are for high voltage spike supression and their counterparts are connected across various components in the circuit. The diodes 108 and 110 are used as free wheeling diodes in the system.

Although the modulator has been illustrated for supplying power to an induction motor through an inverter, it will be appreciated by those skilled in the art that it may be used to supply other types of loads. Thus the modulator can be used to supply a direct current motor, a resistive load, or an inductive load. The output of the modulator can be provided with a suitable filter and the design of this filter depends upon the load to be supplied. In the system of FIG. 1, a filter can be provided that includes two inductances connected in series with one of the output terminals of the modulator and a capacitor connected between a junction of the inductances and the opposite output terminal.

While the embodiments of the present invention as herein disclosed constitute a preferred form, it is to be understood that other forms might be adopted.

I claim:

1. A modulator comprising, input conductors adapted to be connected with a source of direct current, output conductors adapted to be connected with an electrical load, first, second, third, fourth and fifth controlled rectifiers, means connecting the anode of said fifth controlled rectifier with one of said input conductors and its cathode to one of said output conductors, first and second capacitors, a charging circuit for said first capacitor including said first controlled rectifier and an inductance, a charging circuit for said second capacitor including said second controlled rectifier and an inductance, a circuit for discharging said first capacitor connected between one side of said first capacitor and one of said output conductors and including said third controlled rectifier, a discharging circuit for said second capacitor connected between one side of said second capacitor and said one of said output conductors including said fourth controlled rectifier, and means for triggering said controlled rectifiers in a predetermined sequence whereby said capacitors are charged from said input conductors and are discharged through said output conductors, the discharge of one of said capacitors operating to turn off said fifth controlled rectifier when it is gated conductive and operative to turn off one of said third and fourth controlled rectifiers when it is gated conductive.

2. The modulator according to claim 1 where the means for applying the triggering pulses to the controlled rectifiers has a variable frequency output.

3. A modulator comprising, power input conductors adapted to be connected with a source of power, power output conductors adapted to be connected with an electrical load, first, second, third and fourth semiconductor switching devices, first and second capacitors, means connecting said first semiconductor switching device and said first capacitor across said input conductors, means connecting said second semiconductor switching device and said second capacitor across said input conductors, a discharging circuit for said first capacitor connected between said first capacitor and one of said output terminals including said third semiconductor switch, a discharging circuit for said second capacitor connected between said second capacitor and said output conductor including said fourth semiconductor switch means, and a controlled rectifier having its anode-cathode circuit connected in series with one of said input conductors and one of said output conductors, and means for applying triggering signals to said semiconductor switching devices and to said controlled rectifier whereby said semiconductor switching devices and said controlled rectifier are biased conductive in a predetermined sequence, said controlled rectifier being turned off by the discharging of said capacitors through said third and fourth semiconductor switching devices.

4. The modulator according to claim 3 where the semiconductor switching devices are all controlled rectifiers.

5. A modulator comprising, input conductors adapted to be connected with a source of power, output conductors adapted to be connected with an electrical load, a controlled rectifier having anode, cathode and gate electrodes, mens connecting the anode-cathode circuit of said controlled rectifier in series between one of said input conductors and one of said output conductors, a plurality of capacitors, a charging circuit for each capacitor connected across said input conductors, a discharging circuit for each capacitor connected across said output conductors and connected with the cathode of said controlled rectifier, means for controlling said charging and discharging circuits in a predetermined sequence, and means for applying triggering pulses to the gate and cathode electrodes of said controlled rectifier in a predetermined sequence, the discharge of said capacitors providing a turn-off voltage for said controlled rectifier.

6. A pulse modulator for controlling the direct current voltage applied to an electrical load from a source of direct current comprising, input conductors adapted to be connected with a source of direct current, output conductors adapted to be connected with an electrical load, a first controlled rectifier having an anode and a cathode, means connecting the anode-cathode circuit of said first controlled rectifier in series between one input terminal and one output terminal of said modulator, first and second capacitors, second, third, fourth and fifth controlled rectifiers, means connecting said second and third controlled rectifiers in series respectively with said first and second capacitors and across the input terminals of said modulator whereby said capacitors are charged from said source of direct current when said second and third controlled rectifiers are conductive, and means connecting said third and fourth controlled rectifiers respectively between said capacitors and the cathode of said first controlled rectifier, said capacitors discharging through said fourth and fifth controlled rectifiers when they are gated conductive, the discharge energy of said capacitors operative to reverse bias the anode-cathode circuit of said first controlled rectifier and operative to reverse bias the anode-cathode circuit one of said fourth or fifth controlled rectifiers depending upon which of said fourth and fifth controlled rectifiers is conductive.

7. A voltage control circuit for applying a variable direct current to an electrical load from a source of direct current voltage having a substantially fixed terminal voltage comprising, first and second input conductors adapted to be connected with said source of direct current, a third conductor, a first controlled rectifier having an anode connected with said first conductor and a cathode connected with said third conductor, said second and third conductors providing output conductors that are adapted to be connected with an electrical load, first and second capacitors, second and third controlled rectifiers, a charging circuit for said first capacitor connected across said first and second conductors including in a series connection said second controlled rectifier, an inductance and said first capacitor, a charging circuit for said second capacitor connected across said first and second conductors including in a series connection said third controlled rectifier, an inductance and said second capacitor, a discharging circuit for said first capacitor connected between said first capacitor and said third conductor, said discharging circuit for said first capacitor including an inductance and said fourth controlled rectifier, a discharging circuit for said second capacitor connected between said second capacitor and said third conductor, said discharging circuit for said second capacitor including said fifth controlled rectifier and an inductance, said capacitors when discharging through their respective discharging circuits operating to apply turn-off voltage to said first controlled rectifier and operating to turn off either said fourth or fifth controlled rectifier depending upon which controlled rectifier is conductive at that instant of time.

8. A voltage control system for applying a variable direct voltage to an electrical load comprising, a source of direct current, an electrical load, a first input conductor means connected to one terminal of said source of direct current, second output conductor means connected to one terminal of said electrical load, third conductor means forming a common input and output terminal for said system connected respectively with the other terminal of said source of direct current and the other terminal of said electrical load, a controlled rectifier having an anode connected to said first conductor means and a cathode connected to said second conductor means, a first switching means, a capacitor, means connecting said first switching means and said capacitor in series across said first and third conductor means with said first switching means connected to said first conductor means and said capacitor connected to said third conductor means, a junction located between said first switching means and said capacitor, said capacitor being charged from said source of direct current when said first switching means is conductive, a second switching means, means connecting said second switching means between said junction and said second conductor means, said second switching means when conductive forming part of a discharge circuit for said capacitor, means coupled to said first and second switching means and to said controlled rectifier for controlling the switching of said first and second switching means and said controlled rectifier, the discharge of said capacitor operating to turn off said controlled rectifier when it is gated conductive to provide pulse width control for said system, and means coupled to said first and second switching devices for varying the frequency of switching of said first and second switching means when said controlled rectifier is not gated conductive whereby a direct voltage is applied to said load the magnitude of which is a function of the switching frequency of said first and second switching means.

References Cited

UNITED STATES PATENTS

| | | | |
|---|---|---|---|
| 3,131,545 | 5/1964 | Gross et al. | 307—252 X |
| 3,159,755 | 12/1964 | Duncan | 307—252 |
| 3,307,044 | 2/1967 | Furukawa | 307—246 X |
| 3,396,293 | 8/1968 | Harris | 307—265 X |
| 3,436,641 | 4/1969 | Biringer | 307—271 X |

DONALD D. FORRER, Primary Examiner

R. C. WOODBRIDGE, Assistant Examiner

U.S. Cl. X.R.

307—246; 328—68, 122